US011059222B2

(12) United States Patent
Dunne et al.

(10) Patent No.: US 11,059,222 B2
(45) Date of Patent: Jul. 13, 2021

(54) CONTINUOUS DIGITAL PRODUCTION OF 3D ARTICLES OF MANUFACTURE

(71) Applicant: 3D Systems, Inc., Rock Hill, SC (US)

(72) Inventors: Patrick Dunne, Lafayette, CA (US); Seth Astle, Berkeley, CA (US)

(73) Assignee: 3D Systems, Inc., Rock Hill, SC (US)

( * ) Notice: Subject to any disclaimer, the term of this patent is extended or adjusted under 35 U.S.C. 154(b) by 422 days.

(21) Appl. No.: 15/848,064

(22) Filed: Dec. 20, 2017

(65) Prior Publication Data

US 2018/0169940 A1 Jun. 21, 2018

Related U.S. Application Data

(60) Provisional application No. 62/437,417, filed on Dec. 21, 2016.

(51) Int. Cl.
| | |
|---|---|
| *B29C 64/176* | (2017.01) |
| *B29C 64/245* | (2017.01) |
| *B33Y 10/00* | (2015.01) |
| *B29C 64/124* | (2017.01) |
| *B33Y 30/00* | (2015.01) |
| *B29C 64/379* | (2017.01) |
| *B29C 64/393* | (2017.01) |
| *B33Y 50/02* | (2015.01) |

(52) U.S. Cl.
CPC ......... *B29C 64/176* (2017.08); *B29C 64/124* (2017.08); *B29C 64/245* (2017.08); *B29C 64/379* (2017.08); *B33Y 10/00* (2014.12); *B33Y 30/00* (2014.12); *B29C 64/393* (2017.08); *B33Y 50/02* (2014.12)

(58) Field of Classification Search
CPC ... B29C 64/176; B29C 64/379; B29C 64/245; B29C 64/20; B29C 64/35; B29C 64/40; B29C 64/232; B29C 64/393; B33Y 30/00
USPC ........................................................ 264/401
See application file for complete search history.

(56) References Cited

U.S. PATENT DOCUMENTS

| | | | | |
|---|---|---|---|---|
| 5,192,559 A | * | 3/1993 | Hull | B29C 64/188 425/89 |
| 2008/0169586 A1 | * | 7/2008 | Hull | B33Y 50/02 264/401 |
| 2009/0146344 A1 | * | 6/2009 | El-Siblani | A61C 13/0013 264/401 |
| 2016/0059487 A1 | * | 3/2016 | DeSimone | B29C 64/124 264/401 |
| 2017/0173892 A1 | * | 6/2017 | Steele | B29C 64/129 |
| 2017/0304894 A1 | * | 10/2017 | Buller | B22F 3/1055 |

\* cited by examiner

*Primary Examiner* — Francisco W Tschen
*Assistant Examiner* — Edgaredmanuel Troche

(57) ABSTRACT

A three dimensional (3D) printer enables the continuous manufacture of 3D articles of manufacture. The 3D printer includes a 3D print engine for generating articles of manufacture through a layer by layer solidification of a print medium, a transport mechanism, a receiving station, and a controller. The controller is configured to (a) operate the 3D print engine to generate a continuous build platform, (b) concurrently with (a), operate the print engine to generate a plurality of 3D articles of manufacture that are attached to the continuous build platform; and operate the transport mechanism to engage the continuous build platform to transport the continuous build platform along a path that extends between the 3D print engine and the receiving station.

15 Claims, 5 Drawing Sheets

CONTINUOUS DIGITAL PRODUCTION OF 3D ARTICLES OF MANUFACTURE

CROSS REFERENCE TO RELATED APPLICATIONS

This non-provisional patent application claims priority to U.S. Provisional Application Ser. No. 62/437,417, Entitled "CONTINUOUS DIGITAL PRODUCTION OF 3D ARTICLES" by Patrick Dunne et al., filed on Dec. 21, 2016, incorporated herein by reference under the benefit of U.S.C. 119(e).

FIELD OF THE INVENTION

The present disclosure concerns an apparatus and method for the digital fabrication of three dimensional (3D) articles of manufacture. More particularly, the present disclosure concerns an advantageous way of producing the 3D articles of manufacture in a continuous process.

BACKGROUND

Three dimensional (3D) printers are in widespread use. Examples of 3D printer technologies include stereolithography, selective laser sintering, and fused deposition modeling to name a few. One of the early uses of 3D printers was for the fabrication of prototype products. Typically a 3D printer has a reusable build platform upon which a 3D article of manufacture is fabricated. After fabrication the 3D article of manufacture is removed from the build platform. During removal of the 3D article of manufacture, the build platform is not usable and the 3D printer may be idle. Idling the 3D printer can be acceptable for prototype fabrication since production efficiency is not a primary consideration.

It has been envisioned that 3D printing may be used for direct manufacturing. The limitation of building one 3D article of manufacture at a time and then idling the 3D printer is very limiting and may not be economically feasible for some manufacturing. Some 3D printers have partially overcome this by increasing the size of the platform and facilitating the production of multiple 3D objects of manufacture in one build cycle. While this does improve the rate of output it is still a batch process with a costly idle time during which a 3D printer is not in use. There is a desire to enable a 3D printer to operate in a more continuous manner to minimize or even eliminate idle time periods.

BRIEF DESCRIPTION OF THE FIGURES

FIG. 3 is a more particular embodiment of the system depicted in FIG. 1.

SUMMARY

Figure 1:
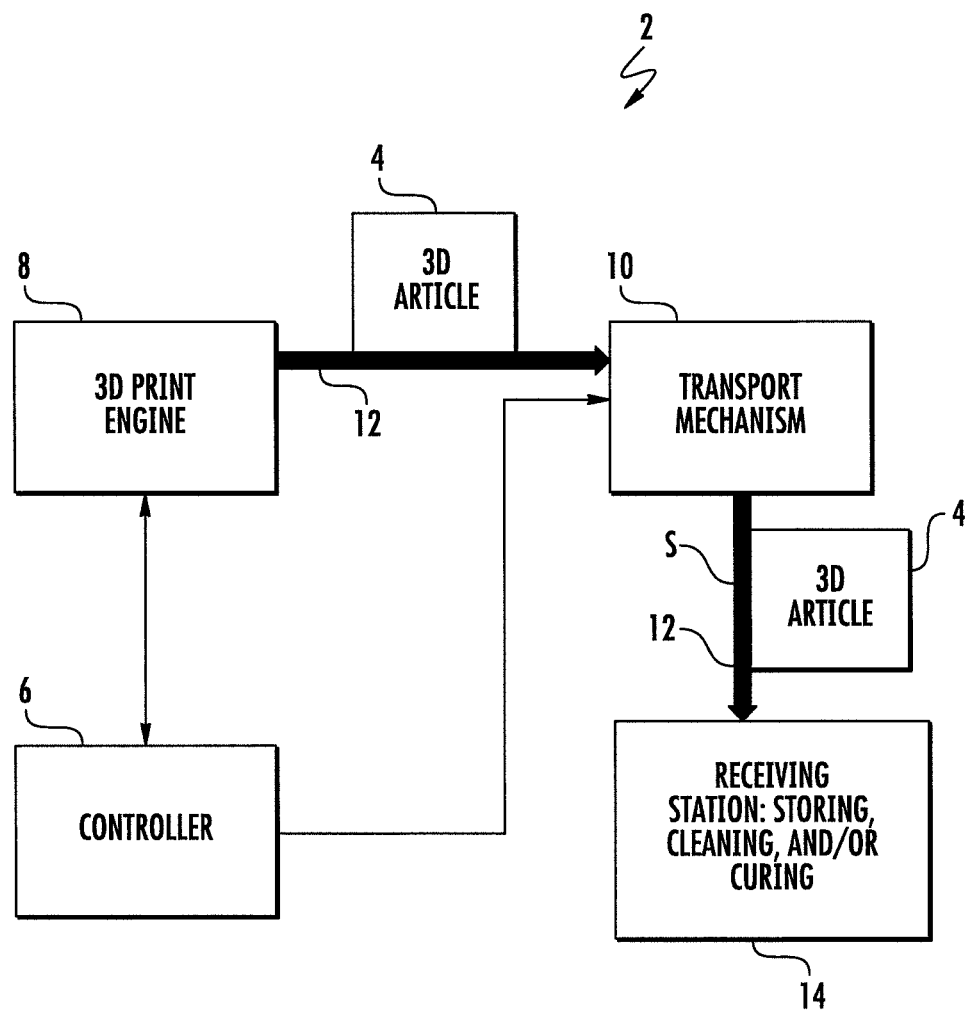
FIG. 1 is a block diagram depicting an exemplary embodiment of a 3D printing system that enables continuous production of 3D articles of manufacture.

In a first aspect of the disclosure, a three dimensional (3D) printing system includes a 3D print engine for generating articles of manufacture through a layer by layer solidification of a print medium, a transport mechanism, a receiving station, and a controller. The controller is configured to (a) operate the 3D print engine to generate a continuous build platform, (b) concurrently with (a), operate the print engine to generate a plurality of 3D articles of manufacture that are attached to the continuous build platform; and operate the transport mechanism to engage the continuous build platform to transport the continuous build platform along a path that extends between the 3D print engine and the receiving station.

In one implementation the controller includes a processor coupled to a non-volatile or non-transient information storage device. The information storage device stores software instructions that, when executed by the processor, perform various steps that include operating the 3D print engine and the transport mechanism.

In another implementation the print engine is a stereolithographic print engine that forms layers of the 3D article of manufacture by photocuring of a liquid resin. In one embodiment, the print engine is a DLP light engine including an ultraviolet (UV) light source providing illumination to a micromirror array. The DLP light engine generates image slice planes to the resin. The image slice plane defines one incremental layer simultaneously added to the continuous build platform and to the 3D article of manufacture.

In yet another implementation the transport mechanism includes a wheel and the continuous build platform is a belt that partially wraps around the wheel during transport of the belt along the path. In one embodiment the belt is rigid between the 3D print engine and the wheel in order to maintain a position of the belt with respect to the 3D print engine. Partially wrapping the belt around the wheel changes the belt from being a rigid belt to being a flexible belt. In another embodiment the belt defines a series of openings and the wheel includes a plurality of sprockets to engage the openings to provide a transport force to the belt. In yet another embodiment the belt is a chain formed by an assembly of chain linkages, the wheel includes a plurality of sprockets to engage openings defined by the chain linkages to provide a transport force to the chain. In a more particular embodiment the chain linkages are initially coupled in order to make the chain rigid, partially wrapping the chain linkages around the wheel breaks the coupling such that the chain is flexible.

In a further implementation the receiving station includes one or more of a cleaning station, a curing station, a surface treatment station, a surface coloring station, and a storage station. In one embodiment the receiving station includes one or more intermediate processing stations and a terminal storage station.

In a second aspect of the disclosure, a method of forming a three dimensional article of manufacture includes (a) operating a 3D print engine to form a continuous build platform, (b) concurrent with (a), operating the 3D print engine to form a plurality of 3D articles of manufacture attached to the continuous build platform, and (c) engaging the continuous build platform with a transport mechanism and thereby transporting the continuous build platform from the 3D print engine to a receiving station.

In one implementation operating the 3D print engine includes sending image slice frames from a light engine to a photocure resin which solidifies layers of the photocure resin to simultaneously define the continuous build platform and the 3D articles of manufacture.

In another implementation the transport mechanism is a wheel, the continuous build platform is a belt, the wheel engages the belt as the belt partially wraps around the wheel, and rotation of the wheel imparts transporting the belt. In one embodiment the belt is rigid between the 3D print engine and the wheel in order to maintain positioning of the belt and the 3D print engine. Wrapping the belt around the wheel changes the belt from being a rigid belt to being a flexible belt.

In a third aspect of the disclosure a 3D printing system includes a vessel for containing a photocure resin, the vessel having a transparent sheet on a lower side, a light engine for projecting image slice frames up through the transparent sheet, a transport mechanism, and a controller. The controller is configured to (a) operate the light engine to solidify a continuous build platform, (b) concurrently with (a), operate the light engine to solidify a plurality of 3D articles of manufacture coupled to the continuous build platform, and operate the transport mechanism to engage the continuous build platform to transport the continuous build platform along a build path that extends from a build plane to a receiving station.

In one implementation the controller includes a processor coupled to a non-volatile or non-transient information storage device. The information storage device stores software instructions that, when executed by the processor, perform various steps that include operating the light engine and the transport mechanism.

DETAILED DESCRIPTION OF THE PREFERRED EMBODIMENTS

FIG. 1 is a block diagram depicting an exemplary embodiment of a three dimensional (3D) printing system 2 that enables continuous manufacture of 3D articles of manufacture 4. The 3D printing system 2 includes a controller 6 that is electrically or wirelessly coupled to a 3D print engine 8 and a transport mechanism 10. Thicker arrows depict motion of a continuous build platform 12 that extends along a path S from the 3D print engine 8 to a receiving station 14.

The controller 6 includes a processor coupled to a non-transient information storage device. The information storage device stores software instructions that, when executed by the processor, perform various steps that include operating the 3D print engine 8 and the transport mechanism 10. The controller can be part of a single integrated circuit (IC) component or distributed across multiple IC components in one location or multiple locations within the printing system 2.

In an exemplary embodiment the 3D print engine 8 is a stereolithography printer. In other embodiments it may include one or more other types of 3D printers such as selective laser sintering, fused deposition modelling, and a hybrid device to name some examples. A stereolithography printer can take on various embodiments. One particular embodiment is described with respect to FIGS. 3 and 4.

In an exemplary embodiment the transport mechanism 10 includes one or more of a rotating gear, a cylinder, and a wheel. A gear is essentially a wheel with outwardly extending sprockets. Other wheels or cylinders can be used such as a grit wheel (in which the outer cylindrical surface has embedded particles to increase friction).

While receiving station 14 is depicted as one station it can include one or more stations 14. Receiving station 14 can include one or more of a cleaning station, a curing station, a surface treatment station, and a coloring station for coloring an outside surface of 3D article of manufacture 4. In one embodiment receiving station 14 includes intermediate processing stations 14 and a terminal storage station 14.

After being fabricated by the 3D print engine 8 a 3D article is further processed in the intermediate processing stations 14 before being placed into the storage station 14. The intermediate processing stations 14 perform one or more processes including cleaning, curing, surface treatment, and coloring.

Figure 2:
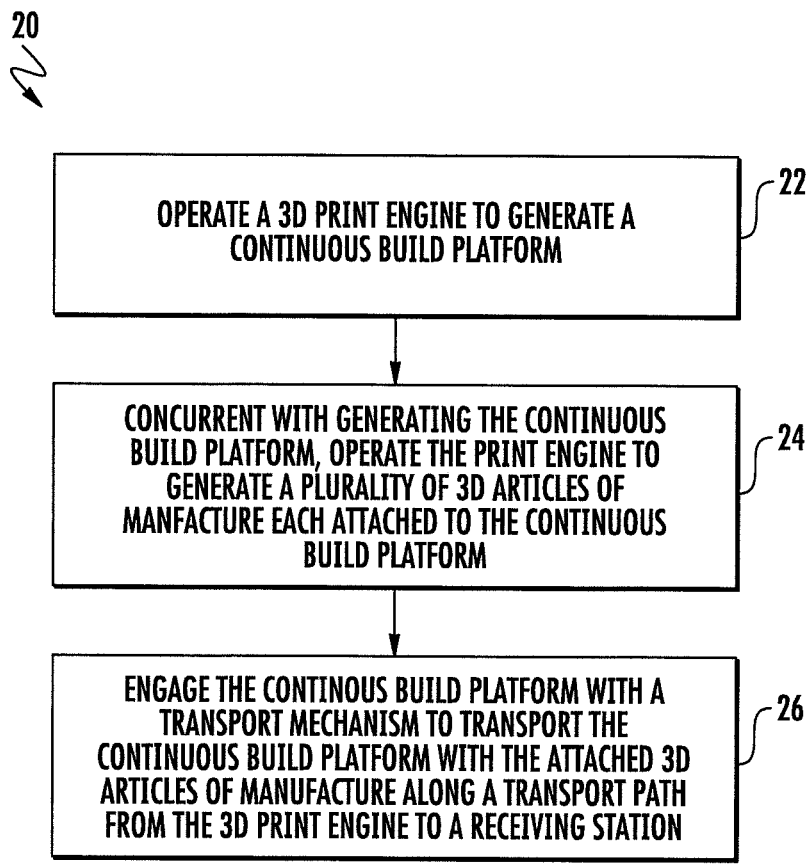
FIG. 2 is a flowchart depicting operation of the 3D printing system depicted in FIG. 1.

FIG. 2 is a flowchart representation of a method 20 of manufacturing the 3D articles of manufacture 4 using the printing system 2 as depicted in FIG. 1. Method 20 may be stored as software instructions in controller 6. Method 20 includes steps 22 and 24 that are executed concurrently by the operation of controller 6 in operating the 3D print engine 8.

According to step 22 the controller 6 operates the 3D print engine 8 to generate a continuous build platform 12. According to step 24 the controller operates the print engine 8 to generate a plurality of 3D articles of manufacture 4 that are attached to continuous build platform 12. According to step 26, the controller 6 operates the transport mechanism 10 to transport the continuous build platform 12 along a transport path S from the 3D print engine 8 to the receiving station 14.

As discussed earlier, the receiving station 14 can include a series of processing stations including intermediate processing stations 14 and a terminal storage station 14. Thus the method 20 may include the transport of the 3D articles of manufacture from the 3D print engine, through the intermediate processing stations, and to the terminal storage station 14.

Figure 3:
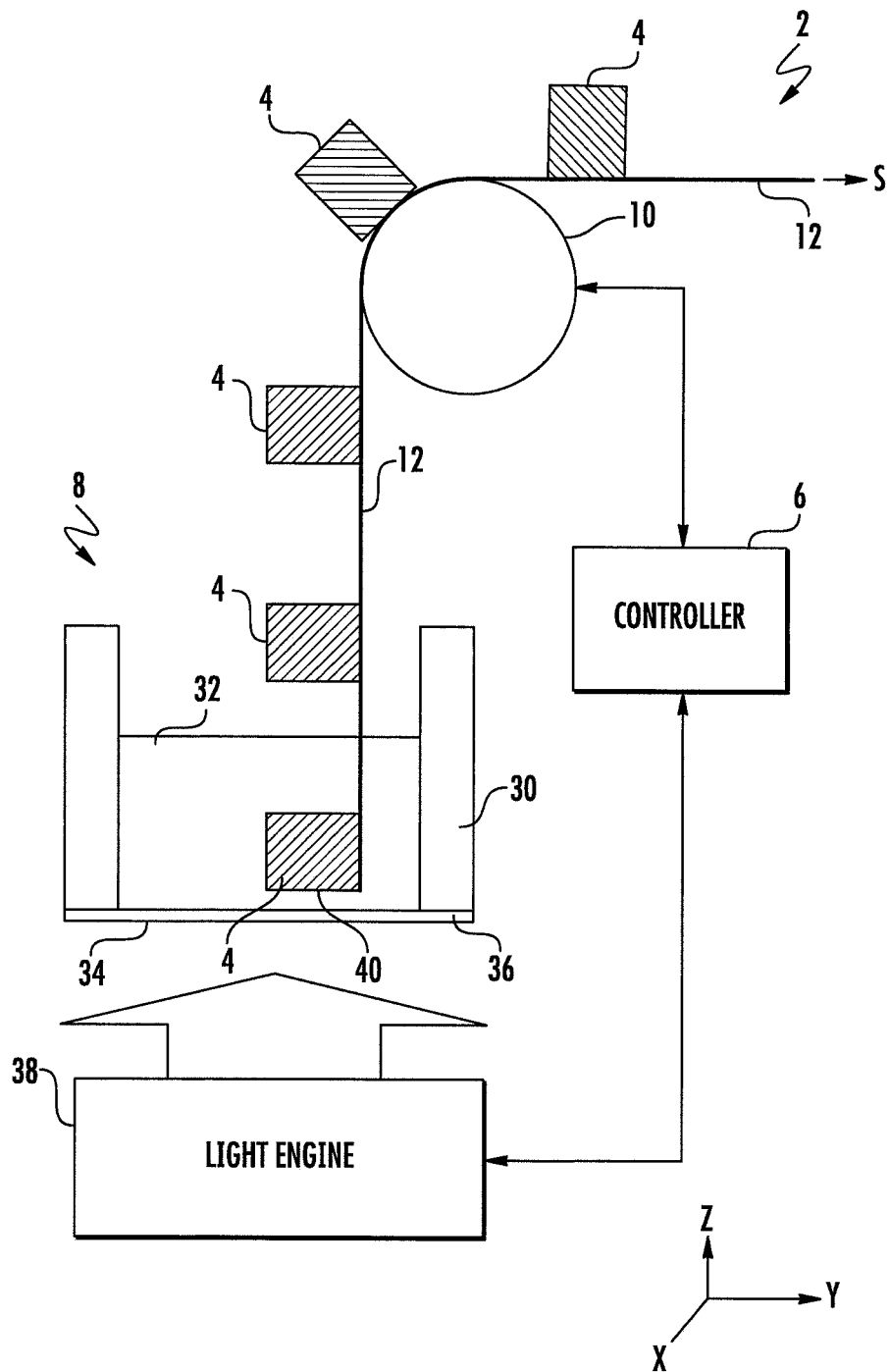
FIG. 3 is a block diagram of an exemplary embodiment of a 3D printing system that enables continuous production of 3D articles of manufacture.

FIG. 3 is a block diagram of an exemplary embodiment of printing system 2. Between FIG. 1 and FIG. 3 like element numbers depicts like elements. Mutually orthogonal axes X, Y, and Z are shown to depict directions. Axes X and Y are referred to as horizontal or lateral axes whereas axis Z is referred to as vertical.

In FIG. 3 the 3D print engine 8 is an embodiment of a stereolithography printer. Stereolithography functions on the principle of the imaging of a photon-curable (photocure) resin with a controlled light source. On some stereolithography embodiments the controlled light source is a scanning laser selectively cures the resin. In other stereolithography embodiments a spatial light modulator (SLM) is used generate a pixelated projection of light that is directed to the resin. The 3D print engine 8 depicted in FIG. 3 is of the SLM variety.

The 3D print engine 8 includes a vessel 30 for containing a liquid photocure resin 32. Vessel 30 includes a transparent sheet 34 on a lower side or portion 36. A light engine 38 is configured to project light up through the transparent sheet 34 in order to selectively cure the photocure resin 32. The resin is cured one layer at a time.

The new cured layer of resin is solidified and formed upon a bottom face 40 of the continuous build platform 12 and the 3D article of manufacture 4. The zone in which the resin is being solidified occurs at a certain Z-height and is referred to as a "build plane." Thus, the build plane is at or proximate to the bottom face 40 as resin is being selectively cured.

The layer added to lower face 40 is formed by projecting an "image slice frame" onto the lower face 40. An image slice frame is a time period during which the light is being applied. The image slice frame can be further divided up into "bit planes" that are smaller time slices. For a bit plane, the light is applied as a two dimensional array of pixels turned on, with the remaining pixels turned off. By utilizing bit planes of variable time duration, pixels can receive a dose of radiation that is modulated to achieve a desired degree of polymerization at that pixel location. Generally speaking, the number of bit planes for an image slice frame period determines the binary resolution of the dosage of light being applied on a per pixel basis. As an example, for 8 bit gray levels, a single frame of time (for example $\frac{1}{30}^{th}$ of a second) is divided into 8 time periods of varying duration. The shortest duration time period can be bit 1. Bit two has twice the time duration of bit one. More generally N+1 has twice the time duration of bit N. Thus this provides 128 levels of intensity for a given pixel.

In one embodiment the light engine utilizes a DLP (digital light projector) system with a UV light source for generating the image slice frames. A DLP system utilizes a micromirror array as its SLM. Alternatively, other SLMs can be used such as LC (liquid crystal arrays) or LCOS (liquid crystal on silicon) to name some other alternatives. Other light sources such as visible blue light can be used for certain types of resin 32.

The transport mechanism 10 includes a wheel 10 whose rotational motion is under control of controller 6. In one embodiment the wheel 10 rotation is controlled by a stepper motor.

The continuous build platform 12 is a belt 12 that extends along the path S from the lower face 40 to a receiving station 14. The belt 12 party wraps itself around the wheel 10 during transport.

In an exemplary embodiment the wheel 10 is a gear 10 with sprockets (not shown in FIG. 3). The belt 12 would have openings for receiving the sprockets that would thereby engage the belt for transport along path S.

In an exemplary embodiment the belt 12 is rigid between lower face 40 and wheel 10. This rigidity allows for better positional control of face 40 relative to the transparent sheet 34. As the belt wraps around the wheel 10 it loses its rigidity and becomes more flexible for the transport along the remainder of path S. This loss of rigidity can be a result of frangible portions of belt 12 that break as the belt 12 is bent around wheel 10.

Figure 4:
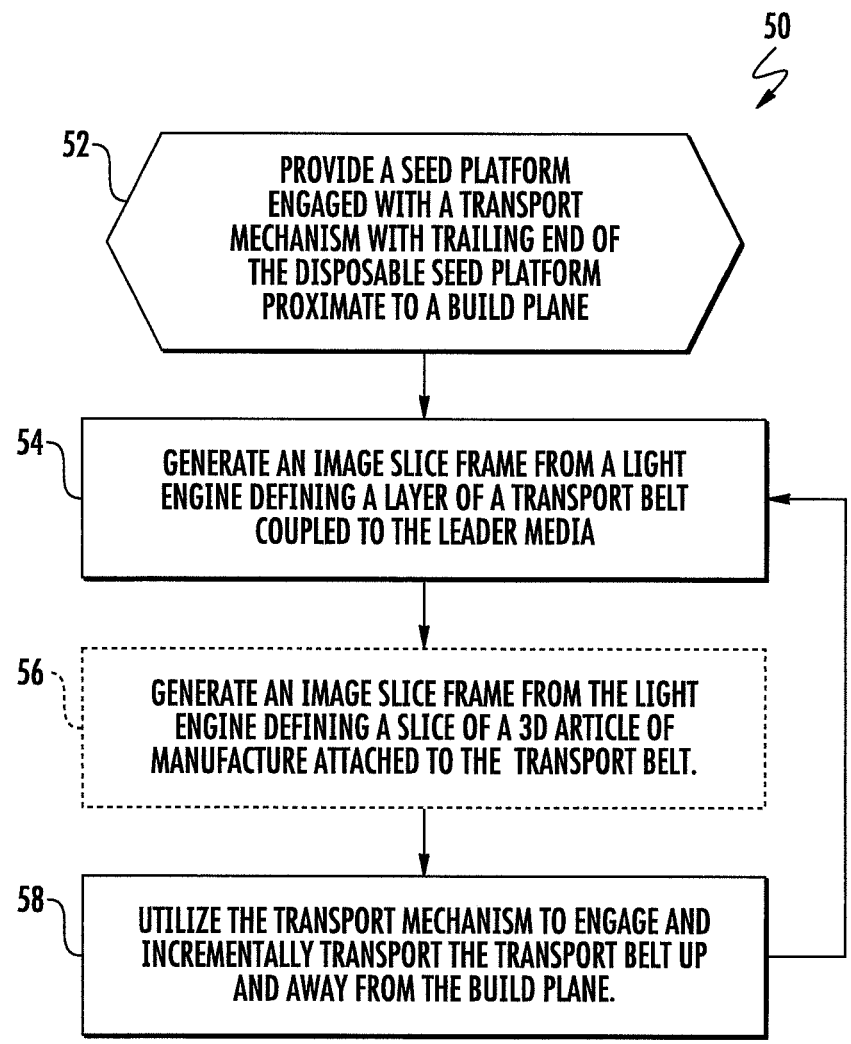
FIG. 4 is a flowchart depicting operation of the 3D printing system depicted in FIG. 3.

FIG. 4 is a flowchart depicting a method 50 for manufacturing 3D articles of manufacture 4 using the 3D printing system of FIG. 3. Method 50 may be stored as software instructions in controller 6.

According to step 52 a seed platform (i.e., a leader belt) is provided that is engaged with transport mechanism 10 and includes a trailing end proximate to the build plane 40. The seed platform therefore functions as a "leader" for belt 12.

According to step 54, the controller 6 operates light engine 38 to generate an image slice frame to define a layer of the transport belt 12. According to step 56, the controller 6 operates light engine 38 to generate an image slice frame to define a layer of the 3D article of manufacture 4 that is attached to transport belt 12. Steps 54 and 56 are performed simultaneously. However, step 56 is shown in dashed outline because, for some layers of the transport belt 12, there is no portion of a 3D article of manufacture 4. This is apparent in viewing FIG. 3 in which there is a vertical spacing between the 3D articles of manufacture 4. In other embodiments there may be no such vertical spacing and then step 56 is always performed with step 54.

According to step 58, the controller operates the transport mechanism 10 (rotates wheel 10) to incrementally transport the trailing end of belt 12 and 3D article of manufacture 4 away from the transparent sheet 34. Steps 54-58 are repeated to continuously fabricate belt 12 with the 3D articles of manufacture 4 attached thereto and to transport them to receiving station 14.

Figure 5:
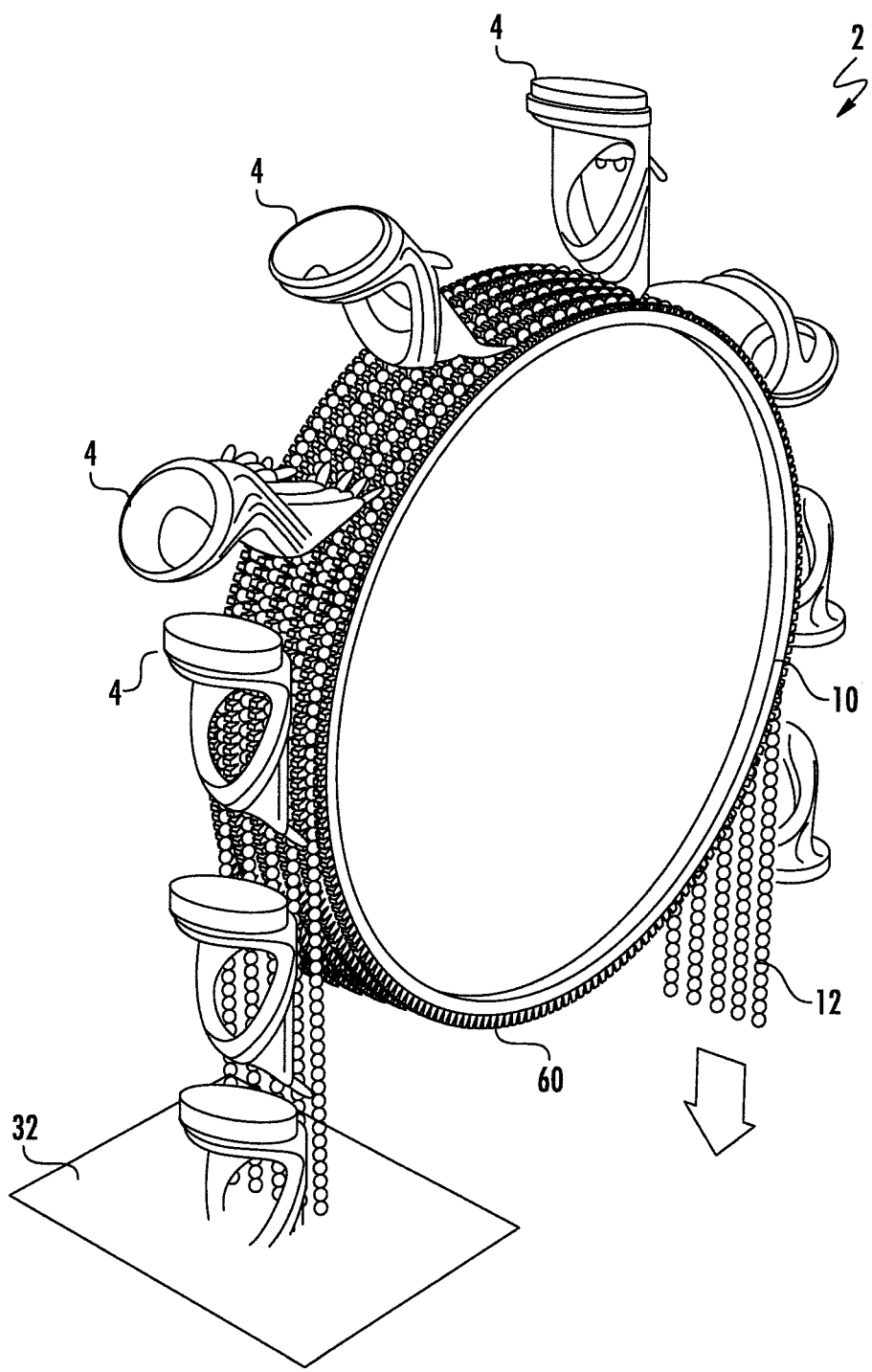
FIG. 5 is an illustration of an embodiment of a transport mechanism engaging a chain belt to which 3D articles of manufacture are attached.

FIG. 5 depicts a portion of the 3D printing system 2 with a more particular embodiment of wheel 10 and belt 12. In this embodiment wheel 10 has sprockets 60 extending radially therefrom. The belt 12 is a chain 12 formed from a large number of links. The links of chain 12 define openings that receive the sprockets 60.

In one embodiment the links of chain 12 are initially coupled by frangible portions whereby chain 12 is rigid before reaching wheel 10. In the process of chain 12 wrapping around wheel 10 the couplings or frangible portions between the links are broken and chain 12 becomes flexible for bending and following along path S.

The specific embodiments and applications thereof described above are for illustrative purposes only and do not preclude modifications and variations encompassed by the scope of the following claims.

What we claim is:

1. A 3D printing system comprising:
   a 3D print engine for generating 3D articles of manufacture through a layer by layer solidification of a print medium;
   a transport mechanism;
   a receiving station; and
   a controller configured to:
   (a) operate the 3D print engine to generate a continuous build platform;
   (b) concurrently with (a), operate the 3D print engine to generate a plurality of 3D articles of manufacture that are attached to the continuous build platform; and
   (c) operate the transport mechanism to engage the continuous build platform to transport the continuous build platform along a path that extends between the 3D print engine and the receiving station.

2. The 3D printing system of claim 1 wherein the print engine is a stereolithographic print engine that forms layers of the 3D article of manufacture by photocuring of a liquid resin.

3. The 3D printing system of claim 1 wherein the transport mechanism includes a wheel and the continuous build platform is a belt that partially wraps around the wheel during transport of the belt along the path.

4. The 3D printing system of claim 3 wherein the belt is rigid between the 3D print engine and the wheel in order to maintain a vertical position of the belt with respect to the 3D print engine.

5. The 3D printing system of claim 4 wherein partially wrapping the belt around the wheel changes the belt from being a rigid belt to being a flexible belt.

6. The 3D printing system of claim 3 wherein the belt defines a series of openings, the wheel includes a plurality of sprockets to engage the openings to provide a transport force to the belt.

7. The 3D printing system of claim 3 wherein the belt is a chain formed by an assembly of chain linkages, the wheel includes a plurality of sprockets to engage openings defined by the chain to provide a transport force to the chain.

8. The 3D printing system of claim 7 wherein the chain linkages are initially coupled in order to make the chain rigid, partially wrapping the chain linkages around the wheel breaks the coupling such that the chain is flexible.

9. The 3D printing system of claim 1 wherein the receiving station includes one or more of a cleaning station, a curing station, a surface treatment station, a surface coloring station, and a storage station.

10. A three dimensional (3D) printing system comprising:
    a vessel for containing a photocure resin, the vessel having a transparent sheet on a lower side;
    a light engine for projecting image slice frames up through the transparent sheet;
    a transport mechanism; and a controller configured to:
(a) operate the light engine to solidify a continuous build platform;
(b) concurrently with (a), operate the light engine to solidify a plurality of 3D articles of manufacture coupled to the continuous build platform; and
(c) operate the transport mechanism to engage the continuous build platform to transport the continuous build platform along a build path that extends from a build plane that is proximate to the transparent sheet and to a receiving station.

11. The 3D printing system of claim 10 wherein the transport mechanism is a wheel and the continuous build platform is a belt that partially wraps around the wheel during transport of the belt along the path.

12. The 3D printing system of claim 11 wherein the belt is rigid between the 3D print engine and the wheel in order to maintain a vertical position of a lower face of the belt with respect to the transparent sheet and partially wrapping the belt around the wheel changes the belt from being a rigid belt to being a flexible belt.

13. The 3D printing system of claim 11 wherein the belt defines a series of openings, the wheel includes a plurality of sprockets to engage the openings to provide a transport force to the belt.

14. The 3D printing system of claim 11 wherein the belt is a chain formed by an assembly of chain linkages, the wheel includes a plurality of sprockets to engage openings defined by the chain to provide a transport force to the chain.

15. The 3D printing system of claim 14 wherein the chain linkages are initially coupled in order to make the chain rigid, partially wrapping the chain linkages around the wheel breaks the coupling such that the chain is flexible.

* * * * *